(12) United States Patent
Jahn et al.

(10) Patent No.: US 9,140,257 B2
(45) Date of Patent: Sep. 22, 2015

(54) DISCHARGE VALVE AND DAMPER FOR A PISTON PUMP

(75) Inventors: Heiko Jahn, Tamm (DE); Marc Zimmerman, Sonthofen (DE); Martin Juretko, Hildesheim (DE); Oliver Hennig, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 13/518,355

(22) PCT Filed: Oct. 28, 2010

(86) PCT No.: PCT/EP2010/066302
§ 371 (c)(1),
(2), (4) Date: Jun. 21, 2012

(87) PCT Pub. No.: WO2011/076467
PCT Pub. Date: Jun. 30, 2011

(65) Prior Publication Data
US 2012/0263613 A1    Oct. 18, 2012

(30) Foreign Application Priority Data
Dec. 23, 2009  (DE) .......................... 10 2009 055 228

(51) Int. Cl.
*F04B 53/10* (2006.01)
*F04B 9/04* (2006.01)
(Continued)

(52) U.S. Cl.
CPC ........... *F04B 53/1007* (2013.01); *B60T 8/4031* (2013.01); *F04B 9/045* (2013.01);
(Continued)

(58) Field of Classification Search
CPC ........ F04B 9/04; F04B 9/045; F04B 11/0091; F04B 11/0033; F04B 17/05; F04B 39/0055; F04B 53/007; F04B 53/1017; B60T 8/4031; B60T 17/02
USPC .................................. 417/540, 543, 470, 471
See application file for complete search history.

(56) References Cited

U.S. PATENT DOCUMENTS 1,942,417 A * 1/1934 Ferlin et al. .................... 137/332
3,114,326 A * 12/1963 Yaindl ........................... 417/567
(Continued)

FOREIGN PATENT DOCUMENTS

DE          27 03 761    *   8/1978   ............... F15B 1/02
DE      102 32 384 A1       2/2003
(Continued)

OTHER PUBLICATIONS

Machine Translation of DE 27 03 761 (Patent Translate) Espacenet May 14, 2015.*
(Continued)

*Primary Examiner* — Bryan Lettman
*Assistant Examiner* — Timothy P Solak
(74) *Attorney, Agent, or Firm* — Maginot, Moore & Beck LLP

(57) ABSTRACT

A piston pump as a return pump of a slip-controlled, hydraulic vehicle braking system is disclosed. There is a mushroom-shaped shut-off body as a spring-loaded outlet valve, the shaft thereof extending through a center hole of a tubular damper piston. The shut-off body is movable transversely to the opening and closing direction thereof, so that said shut-off body aligns with a valve seat upon closing. Upon opening, the damper piston forces brake fluid out of a damping chamber in which it is housed so that an opening movement of the outlet valve is dampened.

8 Claims, 2 Drawing Sheets

(51) Int. Cl.
*F04B 11/00* (2006.01)
*B60T 8/40* (2006.01)
*F04B 53/16* (2006.01)

(52) U.S. Cl.
CPC ......... *F04B11/0033* (2013.01); *F04B 11/0091* (2013.01); *F04B 53/1017* (2013.01); *F04B 53/164* (2013.01); *F04B 53/166* (2013.01)

(56) References Cited

U.S. PATENT DOCUMENTS

| | | | | |
|---|---|---|---|---|
| 3,801,234 A | * | 4/1974 | Love et al. | 417/454 |
| 3,811,801 A | * | 5/1974 | Buse et al. | 417/454 |
| 4,373,872 A | * | 2/1983 | Kemmner et al. | 417/312 |
| 5,156,448 A | * | 10/1992 | Kirstein | 303/113.2 |
| 5,529,466 A | * | 6/1996 | Tackett | 417/529 |
| 5,980,224 A | * | 11/1999 | Regueiro | 417/569 |
| 2002/0028149 A1 | | 3/2002 | Siegel | |

FOREIGN PATENT DOCUMENTS

| | | |
|---|---|---|
| DE | 10 2004 052 817 A1 | 5/2006 |
| DE | 10 2006 035 055 A1 | 1/2008 |
| JP | 52-14221 A | 2/1977 |
| JP | 64-39976 U | 3/1989 |
| JP | 3-97369 U | 10/1991 |
| JP | 2001-50174 A | 2/2001 |
| JP | 2002-115669 A | 4/2002 |

OTHER PUBLICATIONS

International Search Report corresponding to PCT Application No. PCT/EP2010/066302, mailed Apr. 1, 2011 (German and English language document) (5 pages).

* cited by examiner

DISCHARGE VALVE AND DAMPER FOR A PISTON PUMP

This application is a 35 U.S.C. §371 National Stage Application of PCT/EP2010/066302, filed on Oct. 28, 2010, which claims the benefit of priority to Serial No. DE 10 2009 055 228.6, filed on Dec. 23, 2009 in Germany, the disclosures of which are incorporated herein by reference in their entirety.

BACKGROUND

The disclosure relates to a piston pump for a hydraulic vehicle braking system. Piston pumps of this type are known from slip-controlled vehicle braking systems and they are also designated as recirculating pumps.

A piston pump of this type is disclosed in the laid-open publication DE 10 2006 035 055 A1. The known piston pump has a pump piston which can be driven in a to-and-fro lifting movement in a pump bore. What serves as the drive is a rotatably drivable eccentric which is arranged on one end face of the pump piston and against the circumference of which the pump piston bears with its end face.

To control a brake fluid throughflow direction, the known piston pump has two spring-loaded nonreturn valves, one of which forms an inlet valve and the other of which an outlet valve of the piston pump. Balls are customary as shut-off bodies of the nonreturn valves. In the known piston pump, one of the two nonreturn valves has a disk-shaped shut-off body, to be precise the inlet valve which is arranged on an eccentric-remote end face of the pump piston.

SUMMARY

The piston pump according to the disclosure has a spring-loaded nonreturn valve, the shut-off body of which has a damper body together with which it is movable. During the opening of the nonreturn valve, the shut-off body is lifted off from a valve seat of the nonreturn valve and the damper body moves in accompaniment with the shut-off body. For closing, a valve closing spring loads the shut-off body, together with the damper body, against the valve seat. The shut-off body is not connected rigidly to the damper body, but instead is movable with respect to the damper body in the opening and the closing direction. The damper body is received in a damper chamber which, for example, may be a blind hole, out of which said damper body displaces fluid during the opening of the nonreturn valve. The fluid is the fluid which is also conveyed by the piston pump, that is to say brake fluid in a hydraulic vehicle braking system. The fluid may be displaced, for example, through one or more ducts or through a gap between the damper body and a wall of the damper chamber. The list is not conclusive. The displacement of fluid out of the damper chamber by the damper body during the opening of the nonreturn valve has the effect that an opening movement of the nonreturn valve is damped.

Advantageous refinements and developments of the of features of the disclosure are set forth below.

So that the shut-off body is oriented at the valve seat during the closing of the nonreturn valve, said shut-off body is movable transversely to the opening and closing direction. The shut-off body may be movable with respect to the damper body (claim 3) and/or the damper body, together with the shut-off body, may be movable transversely to the opening and closing direction (claim 4).

In particular, the nonreturn valve according to the disclosure is intended as the outlet valve of the piston pump (claim 8) and is arranged at an eccentric-remote end of a cylinder of the piston pump.

BRIEF DESCRIPTION OF THE DRAWINGS

The disclosure is explained in more detail below by means of embodiments illustrated in the drawing in which.

DETAILED DESCRIPTION

Figure 1:
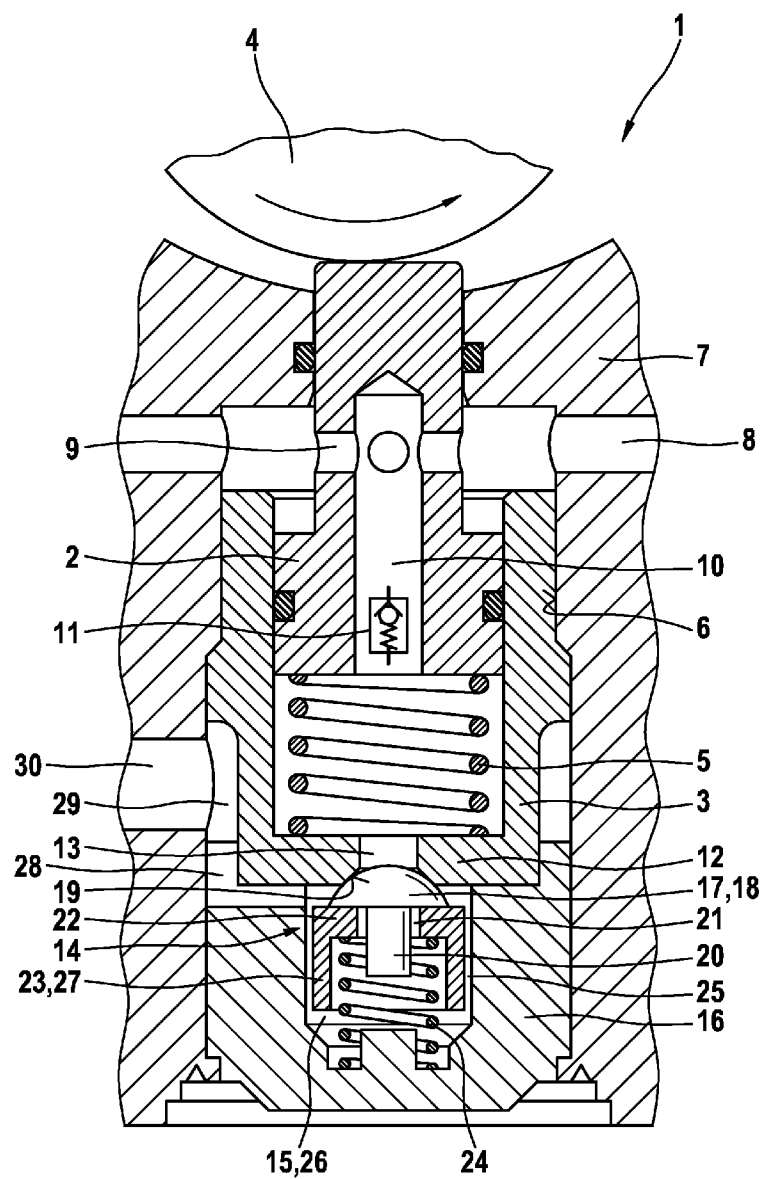
FIG. 1 shows an axial section through a piston pump according to the disclosure.

The piston pump 1 according to the disclosure, illustrated in FIG. 1, is intended as what is known as a recirculating pump for a slip-controlled hydraulic vehicle braking system. It has a pump piston 2 which is received axially displaceably in a cylinder 3. An end face, projecting out of the cylinder 3, of the pump piston 2 bears against a circumference of a rotatably drivable eccentric 4 which drives the pump piston 2 in a to-and-fro lifting movement in the cylinder 3 when the eccentric 4 is driven in rotation. A piston spring 5 which is arranged in the cylinder 3 holds the pump piston 2 in bearing contact against the circumference of the eccentric 4.

The cylinder 3 is introduced into a pump bore 6 in a pump casing 7, and the pump bore 6 guides the pump piston 2 axially displaceably at a near-eccentric end projecting out of the cylinder 3.

The piston pump 1 may have a separate pump casing 7. In the illustrated embodiment of the disclosure, the pump casing 7 is formed by a hydraulic block, in which, in addition to the piston pump 1, further hydraulic structural elements, such as solenoid valves, of a slip control of the hydraulic vehicle braking system are arranged and are connected hydraulically to one another by means of bores. Such hydraulic blocks are known from slip-controlled vehicle brake systems and will not be explained any further here.

An inlet 8 of the piston pump 1 takes place through a bore which intersects the pump bore 6 radially outside the cylinder 3. The inlet 8 leads, further, through mutually intersecting radial bores 9 into an axial blind hole 10 in the pump piston 2. An inlet valve 11, illustrated as a symbol in the drawing, is integrated in the pump piston 2 or is arranged on that end face of the latter which is located in the cylinder 3. The inlet valve 11 is a spring-loaded nonreturn valve.

The cylinder 3 has a bottom 12 on which the piston spring 5 is supported. The bottom 12 has a middle hole which forms a passage 13 of an outlet valve 14 of the piston pump 1. The outlet valve 14 is arranged in a blind hole 15 of a cylinder head 16 which is placed onto the bottom 12 of the cylinder 13. The cylinder head 16 forms a valve casing of the outlet valve 14.

The outlet valve 14 is a spring-loaded nonreturn valve with a mushroom-shaped shut-off body 17. The shut-off body 17 has a head 18 with a spherical surface which co-operates with a conical valve seat 19 formed at a mouth of the passage 13 in the bottom 12 of the cylinder 3. The shut-off body 17 has a shank 20 on a flat underside of the head 18.

The shank 20 of the shut-off body 17 passes through a middle hole 21 in an end wall 22 of a tubular damper body 23. The shank 20 of the shut-off body 17 of the outlet valve 14 has a smaller diameter than the middle hole 21 in the end wall 22 of the damper body 23. The shut-off body 17 is consequently movable transversely to its opening and closing direction, that is to say radially to the cylinder 3, and is oriented on the valve seat 19 during the closing of the outlet valve 14. Any offset of the passage 13 having the valve seat 19 with respect to the cylinder head 16 forming the valve casing is compensated.

A valve closing spring 24, which is designed as a helical compression spring in the illustrated embodiment of the disclosure, loads the damper body 23 and, via this, the shut-off body 17 against the valve seat 19. The valve closing spring 24 is supported on a base of the blind hole 15 in the cylinder head 16.

When the pump piston 2 displaces brake fluid out of the cylinder 3 during a stroke in the direction of the bottom 12 of the cylinder 3, the shut-off body 17 is lifted off from the valve seat 19 and the outlet valve 14 is thereby opened. The damper body 23 moves in accompaniment with the shut-off body 17, the shut-off body 17 being movable with respect to the damper body 23. During the opening of the outlet valve 14, the damper body 23 is pressed into the blind hole 15 in the cylinder head 16 and displaces brake fluid out of the blind hole 15 through an annular gap 25 surrounding the damper body 23 in the blind hole 15. The displacement of brake fluid out of the blind hole 15 has the effect of damping the opening movement of the outlet valve 14. The blind hole 15, because of its action damping the opening movement of the outlet valve 14 in co-operation with the damper body 23, may also be interpreted as a damper chamber 26 and the damper body 23 also as a damper piston 27.

Brake fluid displaced out of the piston pump 1 through the outlet valve 14 flows through radial outlet ducts 28 into a ring line 29 and from there into an outlet 30 which issues radially in the pump casing 7 into the pump bore 6. The ring duct 29 is enclosed between the cylinder 3 and the pump bore 6 and surrounds the cylinder 3 near the outlet valve-side end of the latter.

Figure 2:
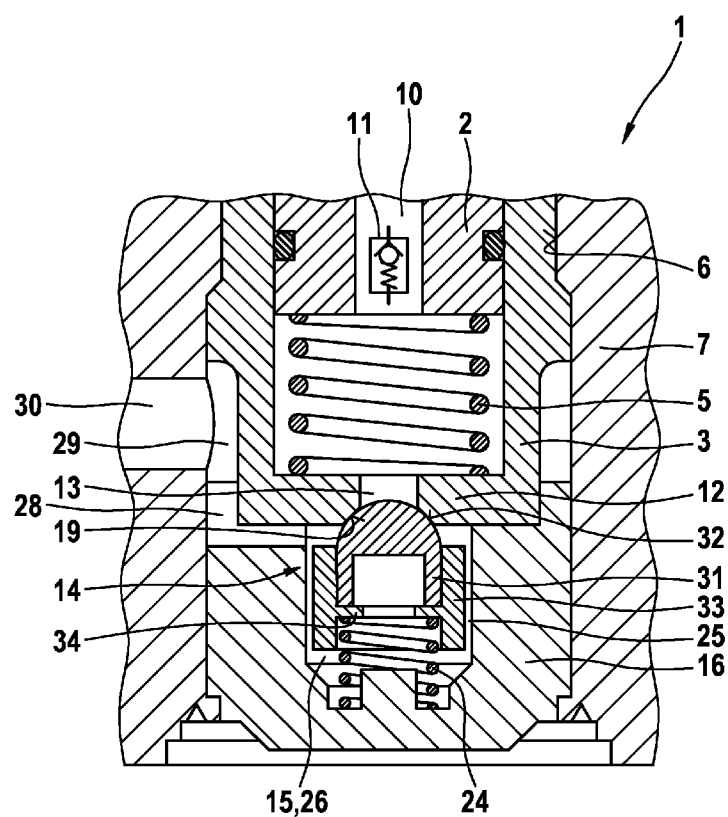
FIG. 2 shows a modified embodiment of the piston pump from FIG. 1 according to the disclosure.

The mushroom shape of the shut-off body 17 of the outlet valve 14 is not mandatory for the disclosure, and, for example, the shut-off body may also be in the shape of a hemisphere or sphere or a disk. FIG. 2 shows a further alternative with a cylindrical shut-off body 31 having a spherical end face 32 which co-operates with the conical valve seat 19 at the mouth of the passage 13 in the bottom 12 of the cylinder 3. With the outlet valve 14 closed, the spherical end face 32 of the shut-off body 31 bears against the valve seat 19.

The shut-off body 31 is received in a tubular damper body 33 which may also be interpreted as a damper piston. The shut-off body 31 is axially displaceable in the damper body 33, that is to say movable in the opening and the closing direction. In contrast to FIG. 1, the shut-off body 31 is not movable in the damper body 33 radially, that is to say transversely to the opening and closing direction. However, in FIG. 2, the damper body 33 and, together with it, the shut-off body 31 are movable radially, that is to say transversely to the opening and closing direction, as a result of play in the blind hole 15 in the cylinder head 16, the blind hole 15 forming a damper chamber 26 here, too. The blind hole 15 has a larger diameter than the damper body 33, so that there is an annular gap 25 surrounding the damper body 33 between the damper body 33 and a wall of the blind hole 15 in the cylinder head 16. Orientation of the spherical end face 32 of the shut-off body 31 on the valve seat 19 during the closing of the outlet valve 14 is thereby possible. The shut-off body 33 has an inward radial flange 34 against which the valve closing spring 24 presses.

As in FIG. 1, in FIG. 2 too, during the opening of the outlet valve 14 the shut-off body 31, together with the damper body 33, is pressed into the blind hole 15 which forms the damper chamber 26. In this case, the damper body 33 displaces brake fluid out of the damper chamber 26 through the annular gap 25 surrounding said damper body, with the result that the opening movement of the outlet valve 14 is damped in the desired way.

With the exception of the differences explained, the piston pump 1 from FIG. 2 is designed identically to the piston pump 1 from FIG. 1 and functions in the same way. To avoid repetition, reference is made, to that extent, to the above explanations relating to FIG. 1 in order to explain FIG. 2. Identical components have the same reference numerals in both figures.

A conical valve seat 19 is not mandatory for the disclosure. The valve seat may also be formed, for example, by a peripheral edge at the mouth of the passage 13 (not illustrated). The list is not conclusive.

The invention claimed is:

1. A piston pump for a hydraulic vehicle braking system, comprising:
a pump piston configured to be driven in a to-and-fro lifting movement, and at least one spring-loaded nonreturn valve configured to control a throughflow direction through the piston pump, the nonreturn valve having a valve seat, a shut-off body and a valve closing spring configured to load the shut-off body against the valve seat,
wherein the shut-off body has a damper body, together with which it is lifted off from the valve seat during the opening of the nonreturn valve and together with which it is loaded against the valve seat by the valve closing spring,
wherein the shut-off body is movable with respect to the damper body in the opening and the closing direction,
wherein the damper body is received in a damper chamber and defines an annular gap between said damper body and said damper chamber sized and configured to permit displacement of fluid from the damper chamber around said damper body as said damper body moves during the opening of the nonreturn valve, and
wherein the shut-off body is movable transversely to its opening and closing direction to provide sealing orientation of the shut-off body on the valve seat during the closing of the nonreturn valve.

2. The piston pump as claimed in claim 1, wherein the valve closing spring is configured to load the damper body.

3. The piston pump as claimed in claim 1, wherein the shut-off body is movable with respect to the damper body transversely to the opening and closing direction.

4. The piston pump as claimed in claim 1, wherein the damper body is movable transversely to the opening and closing direction within said annular gap.

5. The piston pump as claimed in claim 1, wherein the shut-off body is mushroom-shaped with a head which bears against the valve seat when the nonreturn valve is closed, and with a shank configured to guide the shut-off body.

6. The piston pump as claimed in claim 1, wherein the shut-off body has a shank section with a cross-sectional area constant over its length and a hemispherical end face which bears against the valve seat when the nonreturn valve is closed, the cross-sectional area of the shank section being equal to the cross-sectional area of the base of the hemispherical end.

7. The piston pump as claimed in claim 1, wherein the damper body is tubular.

8. The piston pump as claimed in claim 1, wherein the nonreturn valve is an outlet valve of the piston pump.

* * * * *